July 28, 1931.  O. MARISCHAL  1,815,949
ADJUSTABLE LEVEL
Filed April 13, 1928
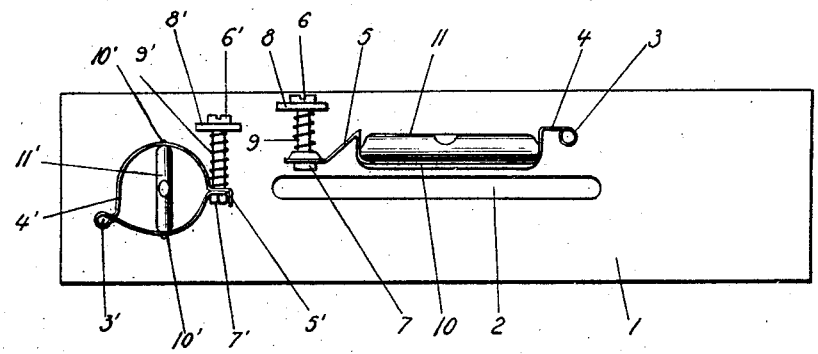
Witnesses:
Gautigon Robert
A. Guillemin
Inventor:
Omer Marischal
By Fred F. Barlow
Attorney.

Patented July 28, 1931

1,815,949

UNITED STATES PATENT OFFICE

OMER MARISCHAL, OF ST. DIE, FRANCE

ADJUSTABLE LEVEL

Application filed April 13, 1928, Serial No. 269,788, and in France April 22, 1927.

My invention relates to improvements in levels and the object of the invention is to provide means for adjusting the tubes containing the spirit or other fluid used in order that the level may be accurately calibrated in a simple manner even though the supporting member for the said tubes should not hold its shape and thereby alter the position of the tubes.

The accompanying figure is a view of my level in front elevation.

My level comprises a base member with true surfaces of either metal or wood as shown at 1. The said base member is provided with the usual opening 2 for making the device as light as possible. Near the center of the level I mount a metallic frame 4 on a stud 3 so that it may pivot thereabout. At the other extremity of said frame 4 is an arm 5 through which extends a screw 6 provided with a nut 7. The head of said screw abuts a bracket 8 and carried by said screw between bracket 8 and arm 5 is a spring 9. Frame 4 is provided with an elongated cup-shaped portion 10 in which is disposed a levelling tube 11 of ordinary construction.

The tube 11 is used for levelling horizontal surfaces.

In order to provide for levelling vertical surfaces I provide near one end of base 1, a stud 3' on which is pivoted a collar 4' bent of sheet metal of a single piece. The free ends of collar 4' are bent in the form of overlapping arms 5'. Disposed adjacent said arms is a fixed bracket 8' and extending through said bracket and said arms is a screw 6'. Disposed on screw 6' between bracket 8', and arms 5' is a spring 9'. The collar 4' is provided with diametrically opposite aperatures 10' engaging the ends of a levelling tube 11'.

From the foregoing it will be obvious that should the base member 1 become deformed and disturb the position of levelling tubes 11 or 11' the said tubes may have their position readily adjusted and compensate for the error by merely turning the nut 7 or 7' and causing the frame 4 or 4' to pivot about the stud 3 or 3'.

Having thus described my invention what I claim as new and desire to secure by Letters Patent is:

1. In a level having a plurality of levelling tubes, a base member, a frame for each of the levelling tubes, one of said frames being formed of a single piece of metal bent in the form of a ring at one end and an apertured arm at the other end, and including means for holding a levelling tube in a position intermediate the two said ends, a levelling tube carried by the said frame, a stud engaging the ring at one end of the said frame and fixed to the said base, a screw extending through the arm at the end of the frame, a nut on the said screw abutting the said arm, a bracket fixed on said base having an aperture through which the screw passes to support the screw, a spring mounted around said screw between the said bracket and the said arm, a second frame for carrying a levelling tube, said second frame being formed from a single piece of metal in the shape of a split ring having free ends, a stud engaging ring formed on said last mentioned split ring, a stud fixed to the base and engaging in said ring, the free ends of the split ring being bent to form overlapping arms, a screw extending through said overlapping arms, a nut on said screw abutting said overlapping arms, a bracket fixed to the base having an aperture through which the screw passes to support the screw, a spring for said screw mounted between the bracket and the said overlapping arms, there being means for carrying a levelling tube in said split ring frame, and a levelling tube carried by said frame.

2. In a level having a plurality of levelling tubes, a base member, a frame for each of the levelling tubes, one of said frames being formed of a single piece of metal bent in the form of a ring at one end and an apertured arm at the other end, with means for holding a levelling tube intermediate the two said ends, said means including an elongated cup shaped portion, a levelling tube carried by the said frame, a stud engaging the ring at one end of the said frame and fixed to the said base, a screw extending through the arm at the end of the frame, a nut on the said screw abutting the said arm, a bracket fixed on said base having an aperture through which the screw passes to support the screw, a spring mounted around said screw between the said bracket and the said arm, a second frame for carrying a levelling tube, said second frame being formed from a single piece of metal in the shape of a split ring having free ends, a stud engaging ring formed on said last mentioned split ring, a stud fixed to the base and engaging in said ring, the free ends of the split ring being bent to form overlapping arms, a screw extending through said overlapping arms, a nut on said screw abutting said overlapping arms, a bracket fixed to the base having an aperture through which the screw passes to support the screw, a spring for said screw mounted between the bracket and the said overlapping arms, there being diametrically opposite apertures in said split ring frame for engaging the ends of a levelling tube, and a levelling tube carried by said frame.

In testimony whereof I affix my signature.

OMER MARISCHAL.